(12) United States Patent
Zhao et al.

(10) Patent No.: US 7,778,203 B2
(45) Date of Patent: Aug. 17, 2010

(54) ON-DEMAND MAC ADDRESS LOOKUP

(75) Inventors: Zhenyu Zhao, Beijing (CN); Xiaosong Yang, Sammamish, WA (US); Dianfei Han, Beijing (CN)

(73) Assignee: Microsoft Corporation, Redmond, WA (US)

( * ) Notice: Subject to any disclaimer, the term of this patent is extended or adjusted under 35 U.S.C. 154(b) by 202 days.

(21) Appl. No.: 12/024,111

(22) Filed: Feb. 1, 2008

(65) Prior Publication Data
US 2009/0196290 A1 Aug. 6, 2009

(51) Int. Cl.
*H04L 12/28* (2006.01)
*G06F 15/16* (2006.01)

(52) U.S. Cl. .................. 370/254; 370/389; 370/401; 709/228

(58) Field of Classification Search .................. None
See application file for complete search history.

(56) References Cited

U.S. PATENT DOCUMENTS

| | | | |
|---|---|---|---|
| 5,982,753 A | 11/1999 | Pendleton et al. | |
| 6,982,953 B1 | 1/2006 | Swales et al. | |
| 7,107,402 B1 * | 9/2006 | Melvin ..................... | 711/118 |
| 7,197,556 B1 | 3/2007 | Short et al. | |
| 7,234,163 B1 | 6/2007 | Rayes | |
| 2002/0009078 A1 * | 1/2002 | Wilson et al. ............... | 370/389 |
| 2002/0013858 A1 | 1/2002 | Anderson | |
| 2005/0010695 A1 * | 1/2005 | Coward et al. ............. | 709/253 |
| 2005/0080931 A1 | 4/2005 | Hardy et al. | |
| 2005/0089051 A1 | 4/2005 | Brooks | |
| 2005/0117537 A1 | 6/2005 | Okabe | |
| 2005/0190752 A1 | 9/2005 | Chiou et al. | |
| 2005/0262218 A1 | 11/2005 | Cox | |
| 2005/0264420 A1 | 12/2005 | Vogel et al. | |
| 2006/0248229 A1 | 11/2006 | Saunderson et al. | |
| 2007/0115967 A1 * | 5/2007 | Vandenberghe et al. ..... | 370/389 |
| 2007/0274290 A1 * | 11/2007 | Takahashi et al. ........... | 370/351 |

FOREIGN PATENT DOCUMENTS

EP 168737 A1 8/2006

OTHER PUBLICATIONS

"NetLoc(zip)", http://search.techrepublic.com.com/search/MAC+address+and+network+adapter.html, year 2007.
"Free IP Scanner", http://software.techrepublic.com/download.aspx?docid=325455, year 2007.
"DHCP Snooping" http://www.enterprisenetworkingplanet.com/netsecur/print.php/3462211, year 2005.
International Search Report, application PCT/US2009/031960, mailed Aug. 25, 2009.

* cited by examiner

*Primary Examiner*—Gregory B Sefcheck
*Assistant Examiner*—Nima Mahmoudzadeh

(57) ABSTRACT

Described is looking up network information (e.g., port data) on demand upon receiving a (e.g., DHCP) request packet containing a MAC address. The MAC address may be looked up in a cache to find the port data. If not cached or cached but outdated, the lookup continues via a querying process that finds the relevant switch containing the port data; the cache is updated based on the querying process result. Successful querying results in a valid cache entry, while unsuccessful querying results in an invalid entry. For port data associated with the MAC address found via the cache or via querying, the port data is used to respond to the request packet, e.g., to assign an IP address to a network device corresponding to that MAC address. For a MAC address determined to be invalid via the cache or via querying, the request is rejected.

19 Claims, 3 Drawing Sheets

ON-DEMAND MAC ADDRESS LOOKUP

BACKGROUND

In a networking environment, each network device has an adapter identified by a Media Access Control, or MAC address, generally comprising a unique identifier. In large-scale computing environments, a reliable and automatic way to collect MAC addresses of a network's servers and other devices is needed for various purposes. For example, if a network device known by its MAC address is confirmed to be at a certain port, e.g., as located within a rack of servers, that device can be consistently assigned the same Internet Protocol (IP) address in response to a Dynamic Host Configuration Protocol (DHCP) request.

A typical way to collect MAC addresses and port data is to periodically connect to (scan) each network switch, and harvest those MAC addresses of which the switch is aware using a "show MAC-address-table" command. However, there are problems with this solution. One such problem is that this periodic harvesting solution is inefficient and does not scale well for large networks. This is primarily because the time needed for scanning is proportional to the number of devices being scanned. Another problem is that MAC addresses maintained by a switch become outdated and are frequently purged from the MAC address table, e.g., on the order of five minutes. As a result, a MAC address often will be purged from a switch's MAC address table before it can be collected.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which information (e.g., port data) corresponding to a MAC address is looked up on demand when a request packet containing that MAC address is received and processed. If port data is associated with that MAC address, the port data is used to respond to the packet, e.g., to assign an IP address to a network device corresponding to that MAC address.

In one example implementation, the MAC address is first looked up in a cache to determine if the MAC address is associated with port data. If not found in the cache or found but outdated, the lookup continues via a querying process that finds the relevant switch containing the port data; the cache is updated based on the result of the querying process. For example, if querying is performed and the port data is successfully returned from a switch, the port data is considered valid, and a timestamp (used for cache entry expiration purposes) is associated with that MAC address and port data in the cache. If querying is unsuccessful, that MAC address is considered invalid (and is associated with a timestamp used for cache entry expiration purposes).

For port data found via the cache or via querying, the port data is used to respond to the request. For a MAC address determined to be invalid via the cache or via querying, the request is rejected.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards querying a switch (or a cache) for a MAC address on demand, such as whenever a DHCP packet related to that MAC address is received. In general, MAC address collection is delayed until the time a DHCP packet is sent from a network device. Because the MAC address is actually used when the device sends out a DHCP packet, collecting the MAC address upon receiving the DHCP packet guarantees that the MAC address is up-to-date and eliminates the need for periodic query scans.

Although many of the examples herein are described with reference to DHCP packets and binding a MAC address to a physical location, it will be understood that these are only examples. Indeed, any protocol that provides a MAC address may be used, such as for dynamic or static IP address assignment, and any need for determining a port to which a MAC address is coupled may benefit from the technology described herein.

As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and networking in general.

Figure 1:
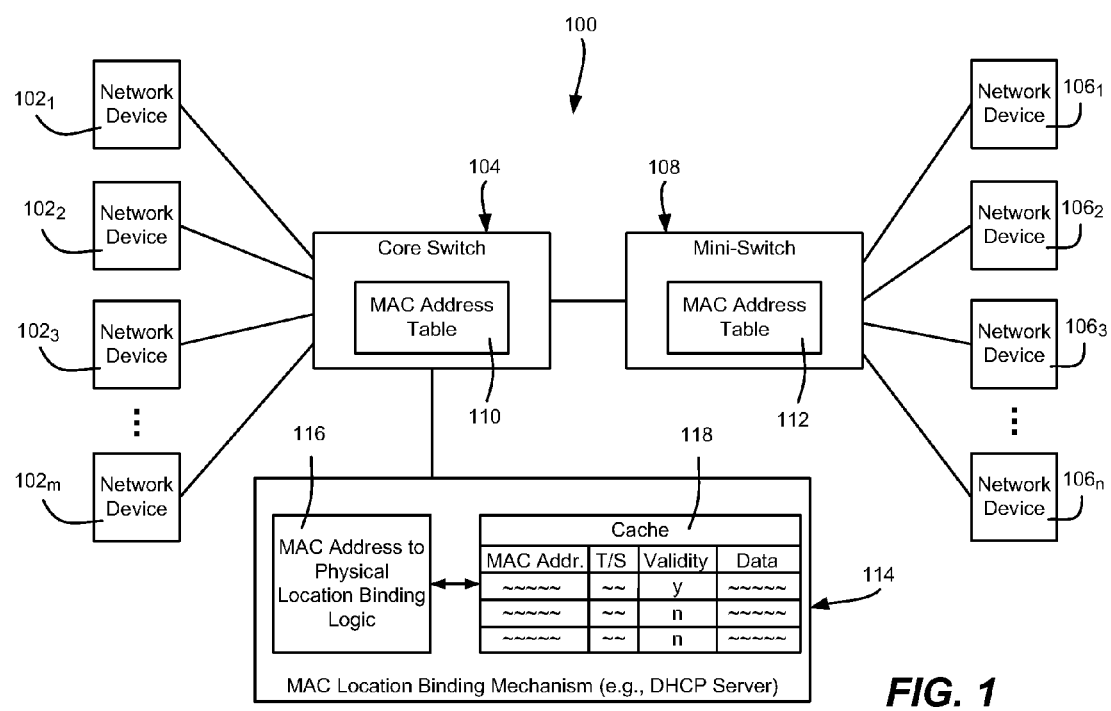
FIG. 1 is a block diagram representing example components of a network in which on-demand MAC address lookup may be performed.

Turning to FIG. 1, one example network 100 includes various first-level network devices $102_1$-$102_m$ coupled to the network via a core switch 104, and various second level network devices $106_1$-$106_n$ coupled to the network via a mini-switch (sometimes referred to as a pod switch) 108 that itself is coupled to the core switch 104. As can be readily appreciated, the network devices may be servers or other devices, possibly including other switches. Thus, for example, other second-level devices (not explicitly shown in FIG. 1) may be present if one or more of the network devices $102_1$-$102_m$ are switches, and further (e.g., third) levels may be provided if one or more of the network devices $106_1$-$106_n$ are switches, and so on if those switches are coupled to further switches.

Each of the switches 104 and 108 maintains a table of MAC addresses corresponding to devices that switch has seen, shown in FIG. 1 as MAC address tables 110 and 112, respectively. Each table records a port for each MAC address, corresponding to where the switch obtained the MAC address. By way of example, if MAC address A comes from port 3, then some device with this MAC address A is connected downstream of port 3, directly or via one or more switches. If only one device is connected via port 3, the MAC address A is the address of the device connected to port 3.

To determine port information related to a MAC address, the MAC address table may be queried via SNMP request and response packets, including an SNMP request packet sent to a switch, with the packet identifying the MAC address being queried. The switch responds with a response packet including the port number at which it saw the MAC address. In the event that the switch does not see that MAC address, the switch instead returns an error.

Because SNMP queries work in such a manner, the correct switch needs to be identified to determine the correct port. This is achieved by querying switches from the high level (e.g., the core level) to one or more lower levels (e.g., second, third and so on as necessary), one-by-one. By way of example, consider the network represented in FIG. 1 (assuming that there are two levels). The first level corresponds to the core switch 14 and the second level corresponds to the mini-switch 108. When a DHCP packet arrives at a MAC location binding mechanism 114 (e.g., a DHCP server in this example), and port information regarding the MAC address contained in that packet is needed, such as by MAC address to physical location binding logic 116, the switches are queried as necessary. Note that such information may be present in a cache 118 as described below, however for purposes of this example consider that the cache information is not present or expired necessitating switch querying.

To obtain the port information, a first query is sent to the core switch 104, which in this example identifies a particular mini-switch from which the packet was sent; (note that there may be multiple such mini-switches coupled to the core switch, such as represented by the mini-switch 108 and any of the first-level network devices $102_1$-$102_m$). With this information, a second packet is sent to that mini-switch (e.g., mini-switch 108) to determine which port sent the packet. As can be seen in this two level network, four SNMP packets in total (two requests and two responses) are used to determine the device/port data. As can be readily appreciated, very little requirements are needed to implement such on-demand MAC address lookup mechanism, generally SNMP access (read-only is sufficient) to the switches, and some topology knowledge of the network.

In one example implementation, the MAC address to physical location binding logic 116 provides the above-described on-demand MAC address lookup mechanism. This logic 116 may be integrated into a MAC location binding mechanism 114 such as a customized DHCP server. For example, with a DHCP server, the MAC location binding mechanism 114 uses this logic 116 to identify from which other network server/device the DHCP packet originated, whereby the DHCP server may respond accordingly. Note that static IP assignment rather than dynamic IP assignment may also benefit from the MAC address lookup mechanism described herein.

As also represented in FIG. 1, a cache 118 may be leveraged for efficiency, such as a local cache (for performance reasons) incorporated into the location binding mechanism 114. More particularly, DHCP requests tend to arrive frequently, one after another, within a short timeframe. It is inefficient to query a switch or set of switches every time a DHCP packet is received. To avoid flooding the switches with SNMP requests for each DHCP packet, caching is used.

To this end, when a MAC address-related query is made to a switch and successfully results in port (and possibly other) data being returned, the result is maintained in the cache 118 for a certain time, e.g., as associated with a timestamp (T/S). Such a record is also characterized as valid, e.g., via a validity field in the record as represented in FIG. 1, or because valid records will contain port data while invalid records will not (e.g., a NULL or the like can indicate no valid port data exists). When a MAC address-related query made to a switch fails, the result is also kept in the local cache, but is characterized as an invalid record; note that many DHCP packets may be broadcast by devices that are not managed by the location binding mechanism 114, and thus such MAC addresses are cached as invalid records (until expired) so as to not require a switch query each time one is received. Thus, a query is sent to a switch only when a MAC address record is not in the cache 118, or when a (valid or invalid) record exists but is outdated.

Figure 2:
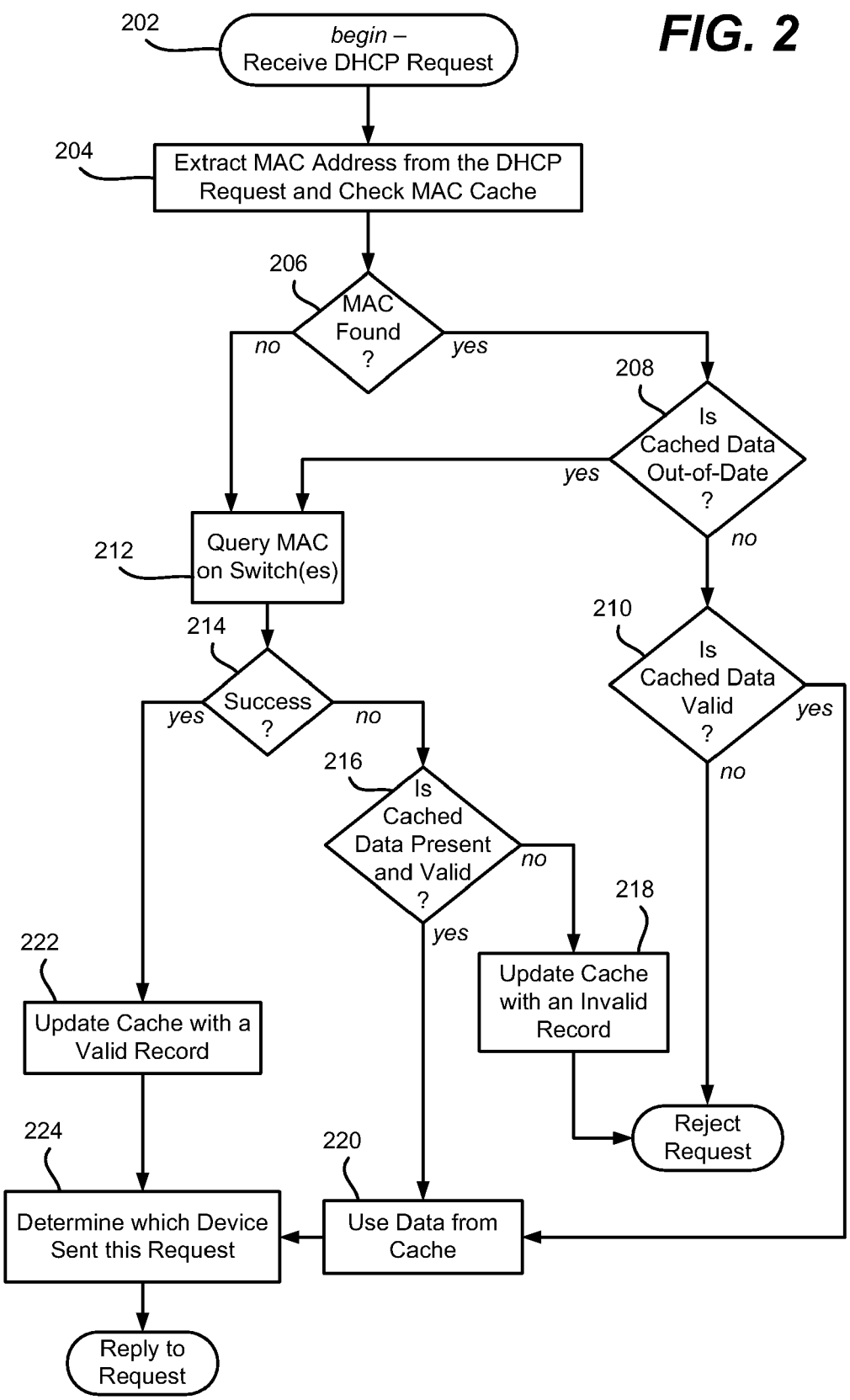
FIG. 2 is a flow diagram representing example steps taken in performing on-demand MAC address lookup.

FIG. 2 is a flow diagram representing example steps that may be taken by the logic 116 to implement an on-demand MAC address lookup mechanism, (where "lookup" corresponds to a switch query or cache lookup of any data associated with a MAC address that a switch maintains, especially but not limited to port data). As can be seen, the example process begins at step 202 where a MAC address is received, in this example via receipt of a DHCP request that contains the MAC address.

Step 204 extracts the MAC address from the DHCP request, and checks the cache for whether a record is present for this MAC address, e.g., via a table lookup. If found, as represented by the "yes" branch associated with step 206, then step 208 further investigates whether the cached data is outdated; (for example an expiration time may be on the order to thirty minutes to an hour, but any suitable expiration time may be used, such as depending on a given network configuration). If not, step 208 branches to step 210 where the validity of the cached data record is evaluated; MAC addresses known as invalid result in the DHCP request being rejected. However, if cached, not outdated (i.e., current) and valid, the cached data (e.g., the port data in the record) may be used as desired, such as for binding the MAC address to a location, as represented by step 220. With the switch port data known, step 224 represents determining which device sent the DHCP request so that an appropriate reply to the request may be made.

Returning to step 206, if the MAC address record is not found, the switch (or switches) are queried as described above as represented by step 212. Similarly, if found but outdated as represented by step 208, step 212 is executed. Note that while step 212 is represented as a single block, it is understood from above that multiple query request/response packets may be sent and received in a multi-level network as needed to locate the appropriate switch and its data.

Step 214 represents determining whether the query operation of step 212 was successful. If so, at step 222 the cache is updated with a valid record (and timestamp of the current time or expiration time) for the MAC address along with its related port data; note that as used herein the concept of an "updated" record also includes initially creating a record if one does not exist. As set forth above, step 224 represents determining which device sent the DHCP request so that an appropriate reply to the request may be made.

If not successful at step 214, there is a possibility that the cache may contain a valid record for this MAC address. More particularly, this corresponds to the out-of-date "yes" branch of step 208 reaching steps 212 and 214, whereby the record is present, possibly valid, but outdated. Although outdated, if present and valid, the cached data is used at step 220 and step 224 to attempt a response. Note that eventually such records may be purged from the cache or the like so that very old records will not remain forever in the cache because they were once designated valid.

Returning to step 216, because the switch querying was not successful at step 214, unless a valid (albeit expired) record is present in the cache, then this DHCP request's MAC address is invalid. If not present, or present but invalid at step 216, step 218 represents updating the cache with an invalid record for this MAC address; as described above, as used herein the concept of "updating" a record also includes initially creating a record if one does not exist.

Exemplary Operating Environment

Figure 3:
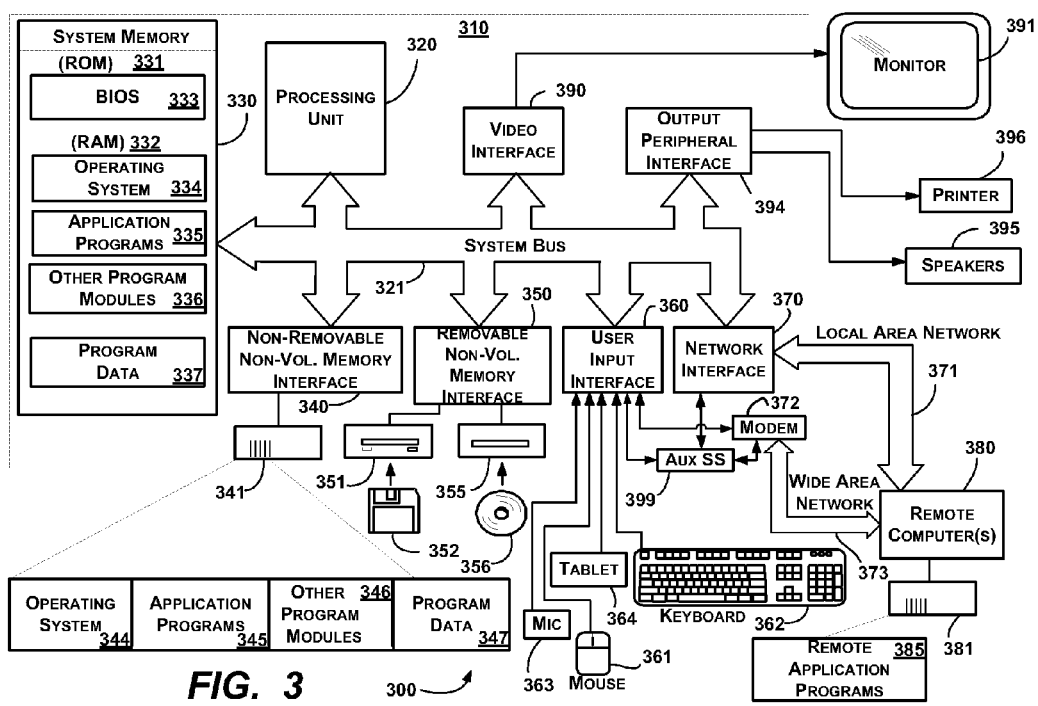
FIG. 3 shows an illustrative example of a computing environment into which various aspects of the present invention may be incorporated.

FIG. 3 illustrates an example of a suitable computing and networking environment 300 on which the examples of FIGS. 1 and 2 may be implemented. For example, the MAC location binding mechanism 114 may be implemented in the computer system 310, while some of the network devices (e.g., $102_1$ and $102_6$) may be represented by the remote computer(s) 380. The computing system environment 300 is only one example of a suitable computing environment and is not intended to suggest any limitation as to the scope of use or functionality of the invention. Neither should the computing environment 300 be interpreted as having any dependency or requirement relating to any one or combination of components illustrated in the exemplary operating environment 300.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 3, an exemplary system for implementing various aspects of the invention may include a general purpose computing device in the form of a computer 310. Components of the computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 310 typically includes a variety of computer-readable media. Computer-readable media can be any available media that can be accessed by the computer 310 and includes both volatile and nonvolatile media, and removable and non-removable media. By way of example, and not limitation, computer-readable media may comprise computer storage media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium, not including signals per se, which can be used to store the desired information and which can accessed by the computer 310.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 3 illustrates operating system 334, application programs 335, other program modules 336 and program data 337.

The computer 310 may also include other removable/non-removable, volatile/nonvolatile computer storage media. By way of example only, FIG. 3 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical storage media, not including optical waves. Other removable/non-removable, volatile/nonvolatile computer storage media that can be used in the exemplary operating environment include, but are not limited to, magnetic tape cassettes, flash memory cards, digital versatile disks, digital video tape, solid state RAM, and solid state ROM. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media, described above and illustrated in FIG. 3, provide storage of computer-readable instructions, data structures, program modules and other data for the computer 310. In FIG. 3, for example, hard disk drive 341 is illustrated as storing operating system 344, application programs 345, other program modules 346 and program data 347. Note that these components can either be the same as or different from operating system 334, application programs 335, other program modules 336, and program data 337. Operating system 344, application programs 345, other program modules 346, and program data 347 are given different numbers herein to illustrate that, at a minimum, they are different copies. A user may enter commands and information into the computer 310 through input devices such as a tablet, or electronic digitizer, 364, a microphone 363, a keyboard 362 and pointing device 361, commonly referred to as mouse, trackball or touch pad. Other input devices not shown in FIG. 3 may include a joystick, game pad, satellite dish, scanner, or the like. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. The monitor 391 may also be integrated with a touch-screen panel or the like. Note that the monitor and/or touch screen panel can be physically coupled to a housing in which the computing device 310 is incorporated, such as in a tablet-type personal computer. In addition, computers such as the computing device 310 may also include other peripheral output devices such as speakers 395 and printer 396, which may be connected through an output peripheral interface 394 or the like.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 3. The logical connections depicted in FIG. 3 include one or more local area networks (LAN) 371 and one or more wide area networks (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360 or other appropriate mechanism. A wireless networking component 374 such as comprising an interface and antenna may be coupled through a suitable device such as an access point or peer computer to a WAN or LAN. In a networked environment, program modules depicted relative to the computer 310, or portions thereof, may be stored in the remote memory storage device. By way of example, and not limitation, FIG. 3 illustrates remote application programs 385 as residing on memory device 381. It may be appreciated that the network connections shown are exemplary and other means of establishing a communications link between the computers may be used.

An auxiliary subsystem 399 (e.g., for auxiliary display of content) may be connected via the user interface 360 to allow data such as program content, system status and event notifications to be provided to the user, even if the main portions of the computer system are in a low power state. The auxiliary subsystem 399 may be connected to the modem 372 and/or network interface 370 to allow communication between these systems while the main processing unit 320 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computer networking environment, a method performed by a DHCP server, the DHCP server comprising a device that assigns IP addresses to hosts, the method comprising:

receiving a request packet comprising a DHCP request, the request packet including data representative of a MAC address of a requesting device that originated the DHCP request;

in response to receiving the request packet, looking up whether port data is associated with the MAC address, and if so, using the port data to respond to the packet, where the looking up comprises transmitting MAC-port queries through multiple levels of switches until a second or higher level switch returns a port associated with the MAC address, the transmitting comprising sending a first MAC-port query to a first switch through which the DHCP server and the second or higher level switch exchange network packets, in response receiving from the first switch information identifying the second or higher level switch, and using the information identifying the second or higher level switch to transmit a second MAC-port query through the first switch to the second or higher-level switch which then returns the port associated with the MAC address; and using the returned port to assign an IP address to the MAC address.

2. The method of claim 1 wherein the transmitting comprises sending a query to a first switch, receiving indicia of a second switch from the first switch, sending a query to the second switch, and receiving the port from the second switch.

3. The method of claim 2 wherein a device that originated the request packet is coupled to the networking environment via a mini-switch coupled to a core switch, the first switch comprising the core switch and the second switch comprising the mini-switch, and the method further comprises obtaining information corresponding to the mini-switch, and using the information to communicate with the mini-switch to look up whether port data is associated with the MAC address.

4. The method of claim 1 wherein looking up whether port data is associated with the MAC address comprises first accessing a cache that associates at least one MAC address with corresponding port data, and performing the transmitting after accessing the cache.

5. The method of claim 1, further comprising receiving a second request packet comprising a second DHCP request and another MAC address, and looking up whether port data is associated with the MAC address by accessing a cache and determining that a record containing information representative of the MAC address is designated invalid, and further comprising, returning a response rejecting the second DHCP request.

6. The method of claim 1 wherein looking up whether port data is associated with the MAC address further comprises accessing a cache, determining that a record in the cache that associates the port data with the MAC address is outdated, and querying at least one switch for the port data.

7. The method of claim 6 further comprising, receiving port data in response to querying, and updating the record in the cache.

8. The method of claim 1 wherein the looking up whether port data is associated with the MAC address further comprises querying at least one switch, receiving an unsuccessful result in response to the querying, updating a record in a cache for the MAC address including designating the record as invalid, and further comprising, rejecting the DHCP request.

9. In a computer networking environment, a system comprising memory and a processor and configured to communicate with a core switch and a mini-switch coupled to the core switch, where a plurality of network devices are coupled to the mini-switch, the system comprising:

MAC address to port binding logic implemented by the memory and processor and coupled with the core switch, the logic handling DHCP requests from the network devices, the logic configured to determine whether MAC addresses provided with the DHCP requests are associated with ports of the switches, and if so, to use the ports to respond to the DHCP requests, where the determining is performed by:

maintaining a cache of entries, each comprising a MAC address and port/validity information indicating either whether the cache entry is valid or identifying a port corresponding to the MAC address of the cache entry, wherein for some of the entries the port/validity information comprises a port number of the corresponding MAC address, and for some of the entries the port/validity information comprises information indicating whether the entry is valid; and for each DHCP request, attempting to find a cache entry having a MAC address that matches the MAC address of the DHCP request, and:

when a cache entry is found for the MAC address and its timestamp indicates that the cache entry is not expired, then, according to the port/validity information of the cache entry, responding to the DHCP request with either a port in the cache entry or with an indication of invalidity, when a cache entry is not found for the MAC or a cache entry is found for the MAC and its timestamp indicates that the cache entry is expired, then: transmitting a query including the MAC of the DHCP request to a switch from which the DHCP request was received, receiving a reply, and according to the reply, setting the port/validity information of a cache entry for the MAC with either a port or an indication of invalidity and replying to the DHCP request with either a port or an indication of invalidity, the transmitting comprising sending a first MAC-port query to a first switch through which the DHCP server and the second or higher level switch exchange network packets, in response receiving from the first switch information identifying the second or higher level switch, and using the information identifying the second or higher level switch to transmit a second MAC-port query through the first switch to the second or higher-level switch which then returns the port associated with the MAC address.

10. The system of claim 9 wherein the switch to which the request is transmitted comprises one of the mini-switches, and the transmitting the request to the switch comprises first querying the core switch to obtain information corresponding to the mini-switch and using such information to transmit to the query to the mini-switch to request port data associated with the MAC address.

11. The system of claim 9 wherein the logic is incorporated into a DHCP server, and wherein a port is received from the switch, the replying to the request comprises providing an IP address assignment that is based on the port.

12. The system of claim 9 wherein one of the network devices coupled to the mini-switch comprises another mini-switch, wherein the network device from which the request is received is coupled to the other mini-switch, and wherein the logic determines whether the MAC address is associated with port data by querying the core switch to obtain information corresponding to the mini-switch, querying the mini-switch to obtain information corresponding to the other mini-switch, and querying the other mini-switch to request port data associated with the MAC address.

13. A computer-readable medium having computer-executable instructions, which when executed by a computing device cause the computing device to perform a process comprising:

receiving a request packet from a network device, the request packet including data corresponding to a MAC address;

determining whether a cache contains information associated with the MAC address; and if the cache contains information associated with the MAC address, determining whether the information is current and valid, and if so, using at least some of the information to respond to the request;

if the cache contains information associated with the MAC address, determining whether the information is current and invalid, and if so, rejecting the request; or if the cache does not contain information associated with the MAC address, or contains information associated with the MAC address that is outdated, querying at least one switch for the information, and if querying is successful, updating the cache for this MAC address as a valid entry and using at least some the information to respond to the request, and if querying is unsuccessful, updating the cache with an invalid entry for this MAC address and rejecting the request, determining that the cache contains information associated with the MAC address that is outdated information, querying at least one switch for new information, and if querying is unsuccessful, determining whether the outdated information is valid, and if so, using at least some of the outdated information to respond to the request, and if the outdated information is invalid, updating the cache with an invalid entry for this MAC address and rejecting the request.

14. The computer-readable medium of claim 13 wherein updating the cache as a valid entry, or updating the cache as an invalid entry, comprises associating a timestamp with that entry.

15. The computer-readable medium of claim 13 wherein querying is successful when port data is returned in response to querying, and wherein using at least some of the information to respond to the request comprises assigning an IP address based on the port data to that network device.

16. The computer-readable medium of claim 13 wherein receiving the request packet comprises receiving a DHCP request at a MAC location binding mechanism.

17. A system according to claim 9, wherein when a cache entry is found for the MAC and its timestamp indicates that the cache entry is expired, and the switch does not respond to the query with a port for the MAC, using a port in the expired cache entry's port/validity information to respond to the DHCP request.

18. A system according to claim 17, wherein the port of the expired cache entry's port/validity information is only used if the port/validity information does not indicate that the cache entry is invalid.

19. A method according to claim 1, wherein the querying through multiple levels of switches comprises the DHCP server querying a first switch from which the DHCP request was received by the DHCP server, the first switch identifies a second a switch from which the DHCP request was sent, and the DHCP server transmits a MAC-port query to the second switch based on it having been identified by the first switch.

* * * * *